Patented Dec. 19, 1950

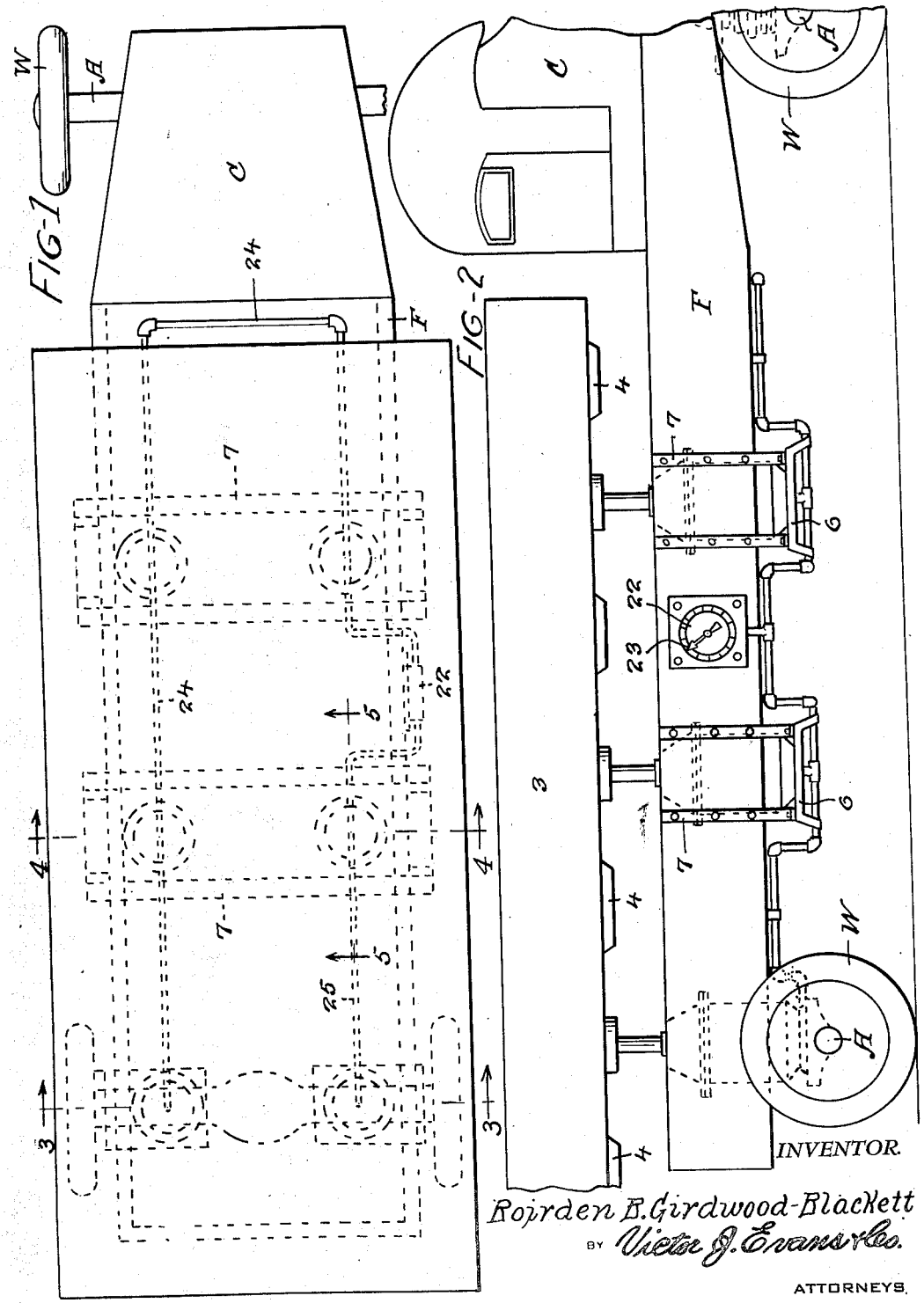
Dec. 19, 1950   R. B. GIRDWOOD-BLACKETT   2,534,766
WEIGHING AUTOMOTIVE TRUCK
Filed Dec. 31, 1946   2 Sheets-Sheet 1
INVENTOR.
Rojrden B. Girdwood-Blackett
BY Victor J. Evans & Co.
ATTORNEYS.

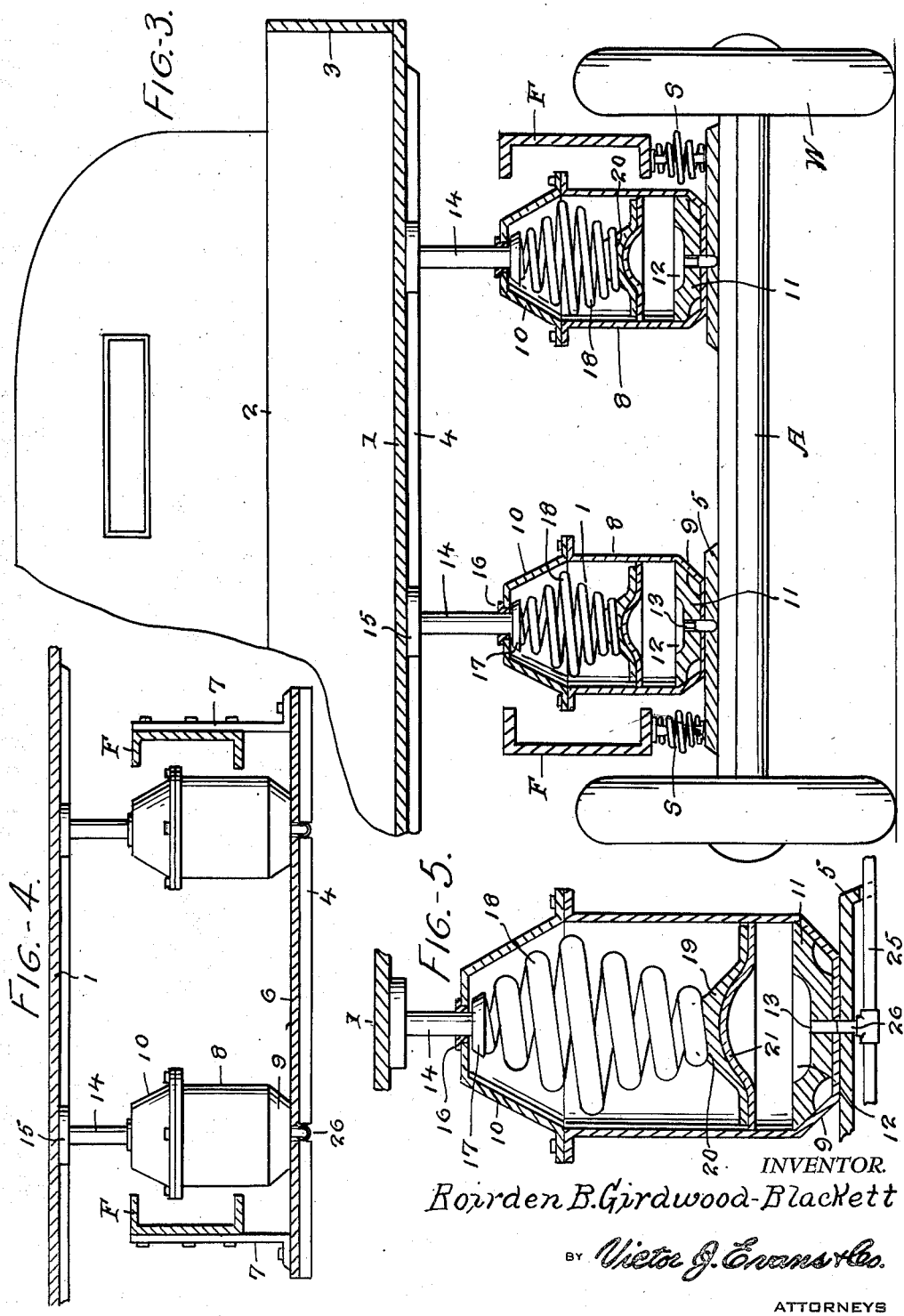

2,534,766

UNITED STATES PATENT OFFICE 2,534,766

WEIGHING AUTOMOTIVE TRUCK

Roirden B. Girdwood-Blackett, Hubertstown, Guapo, Trinidad, British West Indies

Application December 31, 1946, Serial No. 719,421

1 Claim. (Cl. 265—40)

1

My present invention relates to the general class of weight indicating devices, and more specifically to an improved weighing automotive truck or vehicle, which is equipped with a self-contained and automatically operated load-weighing mechanism, or multiple scales of the spiral spring type, employing a fluid-pressure operated, or pneumatic indicator, for showing a load on a truck body.

The primary object of the invention is the provision of an automotive vehicle of this type that includes a minimum number of standardized parts that may be manufactured with facility at comparatively low cost of production, and assembled with convenience, in order to insure a durable, well stabilized load-carrier having accurately operated means for indicating the weight of the load carried by the vehicle.

The invention consists essentially in certain novel combinations and arrangements of parts including a vehicle body that is elevated above the chassis or main frame of the vehicle and resiliently supported by multiple spring scales uniformly distributed to support a load as will hereinafter be described and more specifically set forth in the appended claim.

In the accompanying drawings I have illustrated one complete example of a physical embodiment of my invention in which the parts are combined and arranged in accord with a mode that I have devised for the practical application of the principles of my invention; but it will be understood that changes and alterations are contemplated and may be made in these exemplifying drawings and mechanical structures, within the scope of my claim without departing from the principles of my invention.

Figure 1 is a top plan view, with parts in dotted lines, illustrating a motor truck equipped with the scale mechanism of my invention.

Figure 2 is a view in side elevation of the truck in Figure 1, partly broken away for convenience of illustration, and showing the load-indicator mounted on one side of the vehicle main frame or chassis.

Figure 3 is an enlarged vertical transverse sectional view as at line 3—3 of Fig. 1 illustrating two of the multiple scales mounted over the rear axle of the truck; and Figure 4 is a vertical transverse sectional view on a reduced scale at line 4—4 of Fig. 1 illustrating a pair of the multiple scales supported from the truck frame upon a transverse base plate or frame; and Figure 5 is a further enlarged, vertical sectional view through one of the spring cylinders.

2

In order that the general relation and utility of parts may readily be understood I have disclosed in the assembly views Figs. 1 and 2 a conventional automotive truck having the four wheels W, and front and rear axles A upon which the main frame or chassis F is mounted by the usual springs S; and the driver's cab is indicated by the letter C and mounted at the front of the chassis or frame.

In carrying out my invention the truck is equipped with an elevated and vertically movable body of rectangular shape that includes the horizontal deck or floor 1 having upright ends 2, and side walls 3, together with cross braces 4 beneath the floor or deck, to provide a rigid structure for carrying the load.

The body is resiliently supported in normally elevated position by a plurality of cylinders, here shown as six in number, which are arranged in transversely disposed pairs and the pairs are longitudinally spaced under the body, to insure a uniform distribution of the weight of the load with the load equally distributed about the center of gravity of the body, and to provide the required stability for the loaded body of the truck or vehicle.

Inasmuch as the supporting cylinders are of substantially identical construction and operation, a detailed description of one unit will suffice for all of the units, and it will be understood that the equalized number of units may be varied in adapting the invention to different conditions characteristics of the motor operated vehicle.

With due regard to the center of gravity of the loaded body, the rearmost pair of units is mounted over the rear axle A of the vehicle, by means of flanged base plates 5 that are rigidly fixed to the axle; and the forward and intermediate pairs of units are mounted by means of elongated base plates 6, 6, that are rigidly suspended by frames 7, 7, from the chassis, being bolted or otherwise attached to the channel shaped side members of the main frame or chassis F.

Each unit includes a cylindrical housing or cylinder 8 having an inverted frusto-conical closed bottom 9 that may be welded or otherwise attached to the base plate, and the cylindrical housing is provided with a frusto-conical cap or cover 10 fastened thereon as by bolts passing through complementary flanges, to form a rigid hollow structure that forms a stiff and substantial part of the supporting member of the main frame or chassis of the vehicle.

Within the bottom portion 9 of each cylinder a head 11 is fixed in suitable manner and the upper face of the head is provided with a depression or recess 12, and an air port 13, from which a duct extends downwardly through the bottom wall of the cylinder.

For co-action with each cylinder a vertically arranged plunger bar or piston rod 14 is secured at its upper end to the underside of the elevated deck or floor of the body, and the lower end of each piston rod is reciprocably mounted in an opening in the top wall of the cover or cap 10. A packed and lubricated bearing joint 16 is provided for the plunger to insure an airtight joint. The lower end of the piston rod, within the cylinder is equipped with a retaining head 17, to limit upward movement of the rod within the cylinder to which it is attached, and for co-action with the helical spring 18 mounted within the cylinder.

A spring 18 which is preferably of a double spiral shape is mounted vertically within the cylinder between the retaining head 17 to which its upper end is attached, and a vertically movable head or piston 19, as at 20, so that the head 19 may reciprocate in the cylinder with the flexing of the spring.

The head 19 is in the form of a circular disk having a concavity in its lower face, and a complementary concave liner 21 is attached to the face of the head for frictional engagement with the interior face of the cylindrical housing. The concaved movable head 19 and the fixed head 11 with its recess 12 are thus arranged in opposed relation to form a compression chamber within the cylinder when the spring is depressed.

From this description taken in connection with the drawings it will be apparent that the pistons of the cylinders are depressed by the weight of a load carried within the body of the vehicle, and the air, or other fluid, between the piston and the fixed head is compressed; and the degree of compression is indicated by the use of an indicator 22 having a needle 23 and mounted in accessible position upon the cassis or frame of the vehicle where it may readily be observed.

In order to obtain an accurate reading of the weight of a load in the truck body the load should be equally distributed about the center of gravity of the body.

As herein disclosed the fluid pressure system employed for indicating the measured weight of a load is a pneumatic system, and the indicator is equipped with usual mechanism for rotating the pointer or needle about the dial.

The pneumatic system, as indicated by dotted lines in Fig. 1 includes an air pipe 24 that is connected to three longitudinally arranged cylinders at one side of the vehicle and to a single unit at the opposite side of the vehicle. A second air pipe 25 is connected to the two longitudinally arranged cylinders at one side of the body; and both pipes 24 and 25 are connected to the indicator 22 for actuating the needle or pointer under air pressure.

As best seen in Fig. 5 the air pipes, as 25, are provided with an elbow connection and branch pipe 26 for each of the ports 13 and the pipe passes beneath the flanged base plate adjoining the port, suitable means being employed for supporting the pipes of the pneumatic system from the main frame of the vehicle.

The springs 18 lend elasticity and resiliency to the support of the elevated vehicle body, and the weight of the load is uniformly and widely distributed over the springs to stabilize the loaded body, while the cylinders brace and maintain the springs, as well as the plungers, in corrrect position for efficient use.

Having thus fully described my invention, what I claim as new and desire to secure by Letters Patent is:

In a load weighing vehicle having a body positioned above a chassis, a plurality of spaced vertically disposed cylinders carried by the chassis and distributed thereover, floating pistons positioned in the cylinders, vertically disposed piston rods carried by the said body and extended downwardly and into said cylinders, springs in the said cylinders between the lower ends of the piston rods and pistons for transmitting loads of the body on the piston rods to the said pistons, a load indicator positioned on the said chassis and tubes connecting the said load indicator to the said cylinders, said tubes containing a fluid transmitting agent.

ROIRDEN B. GIRDWOOD-BLACKETT.

REFERENCES CITED

The following references are of record in the file of this patent:

UNITED STATES PATENTS

| Number | Name | Date |
|---|---|---|
| 262,617 | Rehkoph et al. | Aug. 15, 1882 |
| 1,179,962 | Richards | Apr. 18, 1916 |
| 2,109,460 | Brasher | Mar. 1, 1938 |